Nov. 12, 1968  C. GILLET  3,410,200
AUTOMATIC EQUIPMENT FOR GALVANIZING TUBES
Filed June 14, 1965  3 Sheets-Sheet 1

INVENTOR
CHARLES GILLET

BY Holcombe, Wetherill & Brisebois
ATTORNEYS

Nov. 12, 1968  C. GILLET  3,410,200
AUTOMATIC EQUIPMENT FOR GALVANIZING TUBES
Filed June 14, 1965  3 Sheets-Sheet 3

INVENTOR
CHARLES GILLET
BY Holcombe, Wetherill & Brisebois
ATTORNEYS

United States Patent Office 3,410,200
Patented Nov. 12, 1968

3,410,200
AUTOMATIC EQUIPMENT FOR
GALVANIZING TUBES
Charles Gillet, Paris, France, assignor to
Societe Anonyme dite: Vallourec
Filed June 14, 1965, Ser. No. 463,762
Claims priority, application France, June 15, 1964,
978,239
8 Claims. (Cl. 118—423)

ABSTRACT OF THE DISCLOSURE

Equipment for galvanizing elongated objects comprising a tank, a pair of substantially vertical screws in the tank, swinging arms for loading said objects onto opposite sides of the screws at their tops, guides preventing lateral removal of the objects as they descend while the screws are rotated, transfer means for receiving the objects as they fall from the lower end of the screws, moving them clear of the screws, and swinging arms for lifting the treated objects out of the tank.

---

It is known that in order to protect steel tubes from corrosion, they are immersed for a suitable length of time, after having been pickled, in a zinc bath in order to cover them with a protective layer of metal.

Most of the installations for galvanizing tubes which have been used up to now, include a device dipping the tubes continuously into the zinc bath where they stay during the proper length of time, resting on andirons, after which they are manually removed from it.

Two vertical screws rotating with a continuous movement are generally used for dipping the tubes into the bath in such a way that the tubes caught between the threads of these screws and fixed guides, are progressively immersed into the bath.

However such installations are not quite satisfactory because of the fact that on one hand they are not entirely automatic and it is therefore necessary to remove the tubes from the bath by hand, and on the other hand, because of the fact that one is never certain to remove the tubes in the same order in which they have been put into the bath, which causes unwanted irregularities in the thickness of the coating of the tubes.

This present invention covers an equipment providing an entirely automatic way for the immersion of the tubes in the melted zinc bath as well as the removal of these very tubes once they all have been treated under identical conditions.

The present invention covers the new industrial product consisting of an entirely automatic equipment for the galvanization of tubes or of similar objects, this equipment being essentially characterised by the fact that it includes in combination an intermittently operated device ensuring the successive immersions of the tubes to be treated in the bath of liquid zinc and a device for removing the treated tubes which successively takes hold of each tube and removes it from the bath, preferably during the periods while the device used for the immersion is stopped, the duration of the immersion of a tube in the zinc bath being directly determined by the time spent by the device used for the immersion to deliver the said tube to the removing device.

According to a preferred method of applying the invention, the immersion device of the tubes includes two vertical helicoidal screws which have their upper parts emerging from the zinc bath. These screws work together with a conveying device which brings the tubes against the shaft of the screws and at their upper parts and a new tube each time the screws have completed either a complete turn or a half-turn.

The screws are driven by an appropriate device so that they can perform either a complete turn or a half-turn at regular intervals, the frequency of this movement determining the rate of the immersion of the tubes in the zinc bath.

Under these circumstances, it is understandable that the duration during which a tube is held immersed by the screws is directly a function of the product of the number of tubes immersed being on the screws, by the interval of time which separates two consecutive movements of the screws.

According to a preferred method of applying the invention, the conveying of the tubes to be treated on to the screws ensuring the immersion occurs alternately on either side of the shaft of the screws which, under these circumstances, only make half a turn at each starting of the motion. Such a use of the immersion screws is particularly advisable for it allows the immersion of twice the number of tubes which increases, in the same proportion the productivity of the equipment.

According to a special application of the invention, the device for the removal of the tubes which are periodically released at the lower part of the immersion device is formed by the combination of a lateral extractor which separates the tubes from the shaft of the immersion device and of an elevating device which ensures the removal of the said tube.

According to a preferred method of application of the invention, a device made of a fork with vertical branches put on an arm swiveling in a horizontal plane is used to separate the tube from the screw that just released it, in such as way that this arm is slightly sloping relative to the centerline of the tube when it is released by the screw to fall into the fork, then the arm swivels to become perpendicular to the centerline of the tube pushing it aside while holding it in its fork.

This movement leads the tube above two levers each swiveling around a horizontal shaft located above the bath, each of the levers being provided in their lower parts with a bearing surface intended to grasp the tube and to lift it up during the rotating movement of the levers.

According to a preferred application of the invention, the device for the removal of the tubes works at a frequency which is half of the frequency of the device used for the immersion of the tubes, in such a way that one waits until two tubes put on either side of the immersion screws are put in the forks which have been described hereabove to cause the rotation of the arms which are holding these forks and to ensure the simultaneous removal of two tubes which had been successively carried along by the immersion screws.

This method of application is particularly advantageous as it allows the use of the full capacity of the imersion screws and at the same time facilitates the treatment of the tubes at the exit of the bath because these tubes are treated two at a time, which allows to reduce by half the speed of the devices involved.

According to the invention and taking into consideration the fact that the devices for feeding the tubes in, brings but one tube in between two consecutive threads of a screw, it is particularly advantageous to have at one's disposal a set of several immersion screws with threads adapted to the diameters of the tubes to be treated. Thus the full capacity of the equipment can be used whatever the diameters of the treated tubes. In that case, it is possible whenever required, to manage to provide the last bottom thread of each screw with a thread that is always the same, so that whatever the thread of the screw used, the lower part of the screw can always work in the same way with the device used for the lateral removal of the tubes.

According to the invention, it is possible to adjust the duration of the immersion of tubes in the bath easily, by modifying the operating frequency of the immersion device.

According to the invention, it is advantageous to off-set slightly towards the top one of the immersion screws relatively to the other so that all the tubes would be slightly slanted. Thus the circulation of liquids inside the immersed tubes is easier as well as the venting of the air inside the tubes when they are put into the bath. This feature holds a particular interest when the tubes are going through a layer of melted welding flux before being immersed in the actual zinc bath.

In order to make this invention more understandable, hereafter will be described a certain method of application used as an example and reproduced on the enclosed drawings on which:

Figure 3:
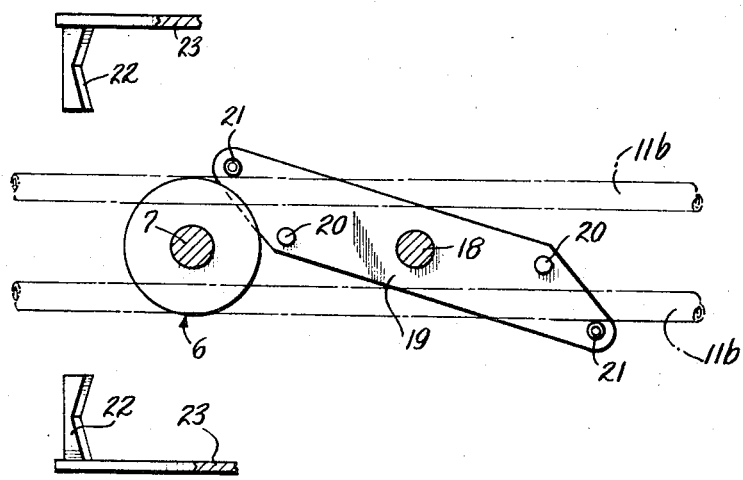
FIGURE 3 is a partial section on a larger scale according to III—III of FIGURE 2.
Figure 4:
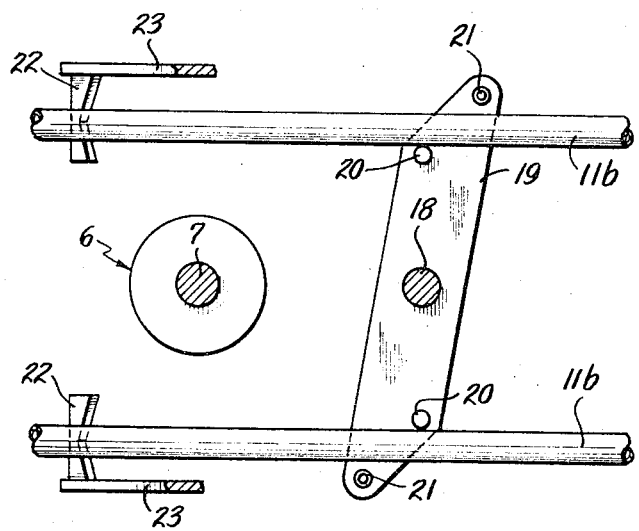

FIGURE 4 corresponds to FIGURE 3 after the rotation of the forks.

The drawing shows basin 1 holding the zinc melted by a heating device which is not drawn as it is not part of the invention.

Figure 1:
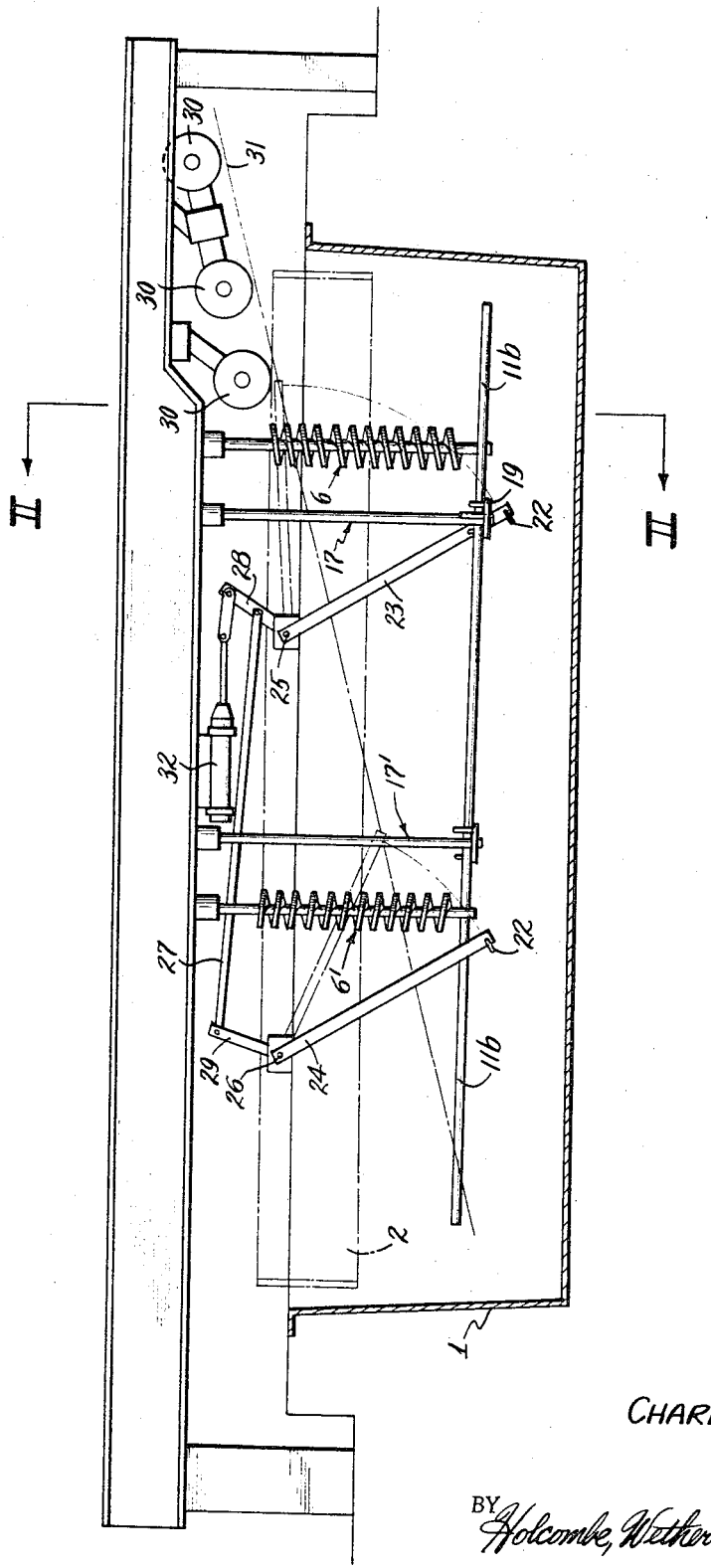
FIGURE 1 is a schematic view of a longitudinal section of an equipment for galvanizing according to the invention.
Figure 2:
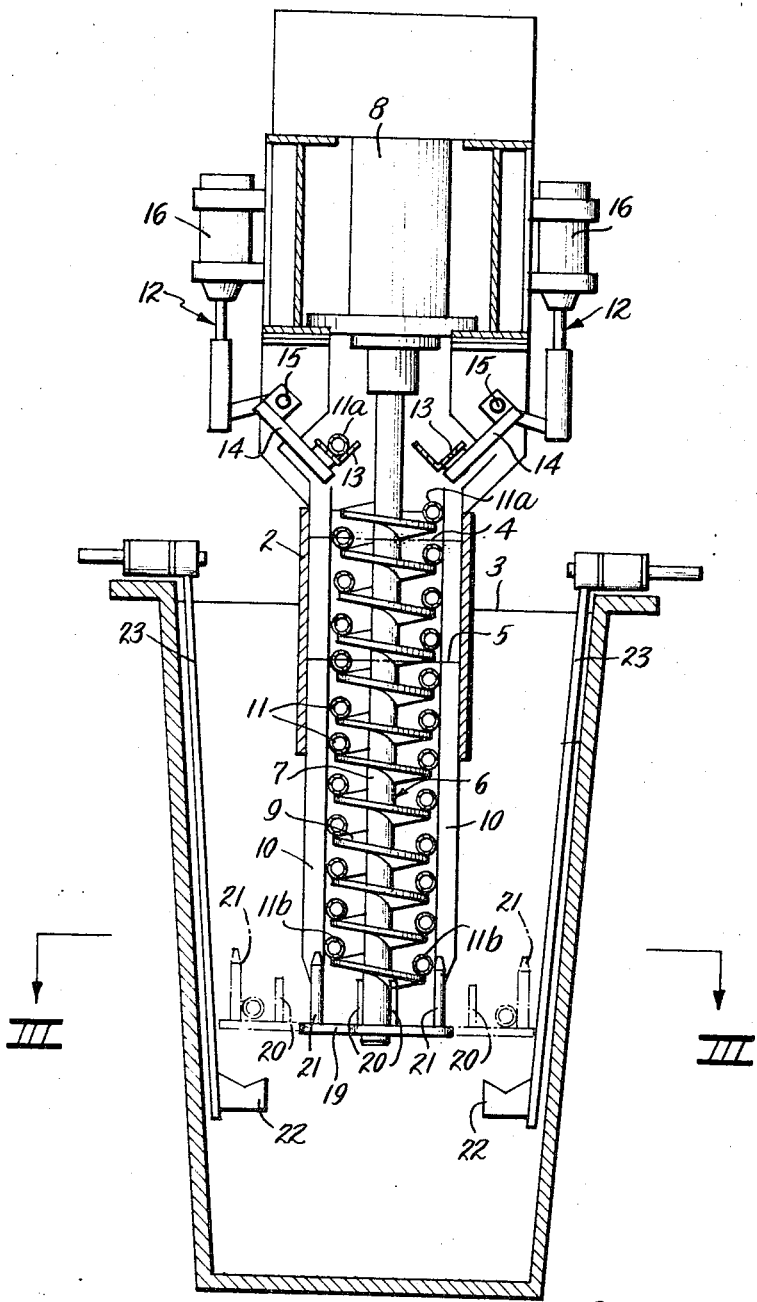
FIGURE 2 is a cross section on a larger scale according to II—II of FIGURE 1.

As it can be seen in cross section on FIGURE 2 and in dot and dash lines on FIGURE 1, a metal sheath 2 surrounds the device for the immersion of the tubes partially dipped into the melted zinc the level 3 of which can be clearly seen on FIGURE 2. The metallic sheath 2 is used to maintain a welding flux, its upper level is shown in 4 and its line of separation with the melted zinc is 5.

The device for immersion is essentially made of the screws 6 and 6' which are slightly off-set towards the top relatively to each other so that the tubes which they carry will always remain slightly slanted.

As it is especially shown in FIGURE 2, screw 6 is fitted on a shaft 7 fixed at its upper part to a device 8 which makes it possible to rotate it by half turn at certain time intervals.

A helicoidal metal ribbon 9 is welded on shaft 7 in order to form the threads, leaving between them enough space for a tube.

Two fixed guides 10 which are arranged vertically on either side of screw 6 prevent the tubes 11 from falling out of the position they hold between two consecutive threads.

At the upper part of screw 6 there is a feeding device 12 located on either side of shaft 7. This device is formed by an angle bar 13 fixed on an arm 14 which swivels around a shaft 15 and it is driven by a hydraulic, pneumatic, electric or electromagnetic device 16.

The tube 11a which is to be immersed is driven on the angle bar 13 parallel to the centerline of the device, i.e., parallel to the plane of FIGURE 1.

One can see on FIGURE 1 the position held by the lateral devices for removal 17 and 17' which consist of a vertical rod 18 that can be moved by rotation as it is going to be explained hereafter, and which is equipped at its lower end with an arm 19 symmetrically located to rod 18 and including two pairs of gudgeon bolts 20 and 21 forming forks with their branches directed vertically towards the top.

The device for driving rod 18 is such that arm 19 can be placed alternatively in the positions shown on FIGURES 3 and 4.

FIGURE 3 corresponds to the position represented by full lines on FIGURE 2, while FIGURE 4 corresponds to the position of arm 19 shown by dashed lines on FIGURE 2.

As can be seen on FIGURE 3, when arm 19 is taken back towards the centerline of tubes 11b, these tubes (which are shown by dot and dash lines on FIGURE 3) which are still caught in the last thread of screw 6, are above the central part of the forks formed by gudgeon bolts 20 and 21.

It is therefore understandable that whenever the rotation of screw 6 frees the two tubes 11b, which are at the lower end of the screw, they would fall between the gudgeon bolts 20 and 21.

Under these conditions, whenever the arm 19 swivels with rod 18 in order to be in the position shown in FIGURE 4, the tubes 11b are moved aside from the shaft of screw 6 in order to take up positions above the bearing surfaces 22 located at the lower end of the removal levers 23 and 24 which are hinged in 25 and 26. The movement of levers 23 and 24 is synchronized by a connecting rod 27 connecting two cranks 28 and 29 of different lengths so that whenever levers 23 and 24 are rotating and causing the removal of tubes 11b, lever 23 moves faster than lever 24 in order to have the tubes 11b in a slanted position in front of the magnetic rollers 30 which are driving the tubes towards shaft 31 represented by dot and dash lines on FIGURE 1.

The movement of levers 23 and 24 depends on a hydraulic, pneumatic, mechanic or electromechanic device 32 working on the extension of crank 28.

The operation of the equipment described above is as follows:

It is supposed that the equipment is operating and in the position shown on FIGURE 2. In this position the removal device is in a low position and the forks are in the position shown on FIGURE 3.

Lever 14 placed on the left of the screw is swung in order to introduce tube 11a from the left. Then the screw is given half a turn with the effect that all the tubes are going down a distance equal to half a thread of the screw, and to free tube 11b located downwards and on the right of the screw (FIGURE 2), the tube falls into fork 20, 21 which is placed under it.

Afterwards, lever 14 located at the right of the screw is swung and therefore the corresponding tube 11a which has in the meantime been moved on to the right angle bar 13 is driven on to the upper thread of the screw. After a proper length of time the screw 6 is again given half a turn which causes tube 11b of the left side to be put down in the corresponding fork. At this moment, the arms 19 shift from the position shown on FIGURE 3 to the position shown on FIGURE 4 by moving aside tubes 11b which pass below the guides 10 to take up position above the bearing surfaces 22 of the removal levers 23 and 24. Device 32 then causes the rotation of levers 23, 24 which will take the position shown by dots and dash lines on FIGURE 1, by pressing tubes 11b against the two sets of magnetic rollers 13 which move them according to centerline 31.

Levers 23 and 24 then come back to their low positions while arms 19 take the position shown on FIGURE 3, which then allows a new cycle of the process described above.

It can be seen that the equipment described above ensures an entirely automatic and always identical galvanizing of tubes and similar products. The thickness of the zinc deposit on the tubes can easily be controlled through varying the frequency of the successive half-turns of the immersion screws and it is understandable that the equipment can easily be adapted to the diameters of the treated tubes through a simple change of the screw thread of the immersion device.

It is obvious that the use of the equipment according to the invention is not restricted to galvanizing but can also be extended to any similar treatments such as tinning, even though the equipment would have to undergo the necessary adjustments.

On the other hand, it is possible within the frame of this invention, to substitute for the removal device described, a screw device similar to the immersion device.

What is claimed is:

1. Automatic equipment for use in galvanizing elongated objects, which equipment comprises a tank for holding liquid zinc, two substantially vertical screws rotatably mounted in said tank, intermittently acting drive means which causes each of said screws to rotate a half turn during each period of actuation, means at the top of said screws for alternately positioning said elongated objects on opposite sides of said screws on the threads thereof, guides on opposite sides of said screws for preventing lateral movement of said elongated objects from their positions on said threads, and means for receiving elongated articles released vertically at the lower end of said screws moving said articles clear of said screws, and lifting them out of the tank.

2. Equipment as claimed in claim 1 in which said means for receiving and moving said articles clear of said screws comprises means which swings about axes parallel to said screws to displace an article received from either side of said screws laterally still further toward the side at which said elongated member is received.

3. Equipment as claimed in claim 1 according to which said lifting means comprises levers mounted to swing about horizontal axes.

4. Equipment as claimed in claim 1 comprising drive means for synchronously swinging said levers, said drive means comprising a connecting rod connecting together two cranks of different lengths fixed to said levers.

5. Equipment as claimed in claim 1 in which said article receiving and moving means is actuated once for every two actuations of said screws.

6. Equipment as claimed in claim 1 in which the screws are substantially identical and each part of one screw is slightly higher than the corresponding part of the other screw.

7. Equipment as claimed in claim 1 comprising means for loading said elongated members alternately onto opposite sides of said screws.

8. Equipment as claimed in claim 1 comprising a continuous inner wall enclosing the upper parts of said screws and extending below the normal level of zinc in said tank, so that a body of descaling flux may be confined within said wall above said zinc.

References Cited

UNITED STATES PATENTS

| | | |
|---|---|---|
| 1,935,087 | 11/1933 | Free. |
| 2,424,808 | 7/1947 | Eckman _____ 118—423 X |
| 2,804,841 | 9/1957 | Salkeld _____ 118—423 |
| 2,856,895 | 10/1958 | Anderson et al. _____ 118—423 |
| 3,030,226 | 4/1962 | Heaton et al. _____ 118—423 X |
| 3,063,409 | 11/1962 | Turner _____ 118—426 |
| 3,217,900 | 11/1965 | Kupetzky et al. |

WALTER A. SCHEEL, *Primary Examiner.*

J. P. McINTOSH, *Assistant Examiner.*